(12) United States Patent
Langenhan

(10) Patent No.: US 9,650,057 B2
(45) Date of Patent: May 16, 2017

(54) WARNING DEVICE AND METHOD FOR WARNING A VEHICLE DRIVER OF A MOTOR VEHICLE

(71) Applicant: Bayerische Motoren Werke Aktiengesellschaft, Munich (DE)

(72) Inventor: Thorsten Langenhan, Otterloh (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 250 days.

(21) Appl. No.: 14/445,310

(22) Filed: Jul. 29, 2014

(65) Prior Publication Data

US 2015/0015386 A1    Jan. 15, 2015

Related U.S. Application Data

(63) Continuation of application No. PCT/EP2013/051708, filed on Jan. 29, 2013.

(30) Foreign Application Priority Data

Feb. 2, 2012    (DE) ........................ 10 2012 201 513

(51) Int. Cl.
*B60Q 1/00*    (2006.01)
*B60W 50/14*    (2012.01)
(Continued)

(52) U.S. Cl.
CPC ............ *B60W 50/14* (2013.01); *B60W 30/00* (2013.01); *G07C 5/08* (2013.01); *B60K 28/066* (2013.01);
(Continued)

(58) Field of Classification Search
CPC .. B60K 35/00; B60K 37/02; B60K 2350/352; B60K 37/06; B60K 2350/1072;
(Continued)

(56) References Cited

U.S. PATENT DOCUMENTS

| 6,262,657 B1 | 7/2001 | Okuda et al. | |
| 8,787,936 B2 * | 7/2014 | Tibbitts | ................ H04W 48/04 455/456.1 |

(Continued)

FOREIGN PATENT DOCUMENTS

| CN | 101844542 A | 9/2010 |
| DE | 100 00 473 A1 | 10/2000 |

(Continued)

OTHER PUBLICATIONS

Chinese Office Action issued in counterpart Chinese Application No. 201380007624.X dated Jan. 20, 2016, with English translation (twelve (12) pages).

(Continued)

*Primary Examiner* — Joseph Feild
*Assistant Examiner* — Rufus Point
(74) *Attorney, Agent, or Firm* — Crowell & Moring LLP

(57) ABSTRACT

A warning device in a motor vehicle is provided for warning a vehicle driver as a function of a triggering signal of a driver assistance system in response to a certain event requiring a driver take-over. In this case, a mobile terminal is present in the vehicle, which can be connected with the driver assistance system and has a corresponding program module, by which the unrestricted use of the mobile terminal is basically permitted, but which, interrupts the unrestricted use and outputs a warning signal, prompting the driver to take over when the triggering signal is received.

10 Claims, 2 Drawing Sheets

(51) Int. Cl.
*G07C 5/08* (2006.01)
*B60W 30/00* (2006.01)
*B60W 50/16* (2012.01)
*B60K 28/06* (2006.01)
*B60W 50/00* (2006.01)

(52) U.S. Cl.
CPC ..... *B60W 50/16* (2013.01); *B60W 2050/0072* (2013.01); *B60W 2050/143* (2013.01); *B60W 2050/146* (2013.01)

(58) Field of Classification Search
CPC ..... B60K 28/066; B60W 50/14; B60W 30/00; B60W 2050/146; B60W 50/16; B60W 2050/0072; B60W 2050/143; G07C 5/08
USPC .......................................................... 340/438
See application file for complete search history.

(56) References Cited

U.S. PATENT DOCUMENTS

| | | | |
|---|---|---|---|
| 9,185,526 B2* | 11/2015 | Guba | G08G 1/20 |
| 2004/0181340 A1* | 9/2004 | Smith | G08B 21/10 |
| | | | 702/3 |
| 2004/0198306 A1* | 10/2004 | Singh | H04M 1/66 |
| | | | 455/345 |
| 2004/0214615 A1 | 10/2004 | Entenmann et al. | |
| 2006/0103513 A1 | 5/2006 | Ihara et al. | |
| 2007/0182529 A1 | 8/2007 | Dobler et al. | |
| 2009/0002147 A1* | 1/2009 | Bloebaum | H04M 1/6075 |
| | | | 340/466 |
| 2009/0009603 A1* | 1/2009 | Kim | G08G 1/166 |
| | | | 348/148 |
| 2009/0174572 A1* | 7/2009 | Smith | G08G 1/0965 |
| | | | 340/902 |
| 2009/0233575 A1* | 9/2009 | Morrison | G08G 1/096725 |
| | | | 455/404.2 |
| 2009/0315992 A1 | 12/2009 | Haug | |
| 2010/0063649 A1 | 3/2010 | Wu et al. | |
| 2011/0050460 A1* | 3/2011 | Bruns | H04M 1/6075 |
| | | | 340/905 |
| 2011/0111724 A1* | 5/2011 | Baptiste | H04M 1/6075 |
| | | | 455/404.1 |
| 2011/0190972 A1* | 8/2011 | Timmons | G01C 21/34 |
| | | | 701/31.4 |
| 2012/0071140 A1* | 3/2012 | Oesterling | H04W 4/12 |
| | | | 455/414.1 |
| 2012/0078509 A1* | 3/2012 | Choi | G01C 21/3461 |
| | | | 701/423 |
| 2012/0083960 A1* | 4/2012 | Zhu | G05D 1/0214 |
| | | | 701/23 |
| 2012/0172012 A1* | 7/2012 | Sumcad | H04W 4/12 |
| | | | 455/414.1 |
| 2013/0218396 A1* | 8/2013 | Moshchuk | B60W 50/08 |
| | | | 701/25 |
| 2014/0058632 A1* | 2/2014 | Jungman | B60K 28/063 |
| | | | 701/48 |
| 2015/0276415 A1* | 10/2015 | Shrinath | G01C 21/36 |
| | | | 701/1 |

FOREIGN PATENT DOCUMENTS

| | | |
|---|---|---|
| DE | 102 26 425 A1 | 12/2003 |
| DE | 103 22 458 A1 | 12/2004 |
| DE | 10 2005 049 881 A1 | 10/2006 |
| DE | 10 2006 007 343 A1 | 8/2007 |
| DE | 10 2007 012 132 A1 | 9/2008 |
| DE | 10 2008 038 816 A1 | 2/2010 |
| DE | 10 2009 054 100 A1 | 6/2010 |
| DE | 10 2009 048 492 A1 | 3/2011 |
| DE | 10 2009 050 404 A1 | 5/2011 |
| EP | 1 467 543 A2 | 10/2004 |
| EP | 2 392 501 A2 | 12/2011 |
| JP | 2007-512989 A | 5/2007 |
| WO | WO 2011/035799 A1 | 3/2011 |

OTHER PUBLICATIONS

International Search Report dated May 14, 2013 with English translation (eight (8) pages).
German Search Report dated Sep. 3, 2012, including English translation (ten (10) pages).
Chinese Office Action issued in Chinese counterpart application No. 201380007624.X dated Sep. 28, 2016, with partial English translation (Nine (9) pages).

* cited by examiner

WARNING DEVICE AND METHOD FOR WARNING A VEHICLE DRIVER OF A MOTOR VEHICLE

CROSS REFERENCE TO RELATED APPLICATIONS

This application is a continuation of PCT International Application No. PCT/EP2013/051708, filed Jan. 29, 2013, which claims priority under 35 U.S.C. §119 from German Patent Application No. 10 2012 201 513.2, filed Feb. 2, 2012, the entire disclosures of which are herein expressly incorporated by reference.

BACKGROUND AND SUMMARY OF THE INVENTION

The invention relates to a warning device in a motor vehicle for warning a vehicle driver if a take-over by the driver is required when the driver assistance system is deactivated, as well as a corresponding method of operating same.

Current vehicles are often equipped with a plurality of driver assistance systems which have the purpose of supporting the driver. In particular, there already are a number of driver assistance systems which take over at least a part of the vehicle guidance, so that the driver is relieved. Consequently, the driver's attention with respect to the current traffic situation may be reduced for fairly long phases.

In order to inform the driver of a change in the assistance function, for example, as a result of changed traffic conditions or even of an automatic deactivation of the driver assistance function, visual, acoustic or haptic signals are as a rule generated by means of a warning device, which signals should be easily perceptible by the driver.

Thus, for example, from German Patent Document DE 10 2009 050 404 A1, a method is known for controlling a fully automatic driver assistance system constructed for driver-independent vehicle guidance which, in the event of a required take-over by the driver, as a function of a determined take-over readiness by the driver, generates a warning information and/or a driver take-over prompt in the form of a corresponding visual, acoustic and/or haptic information.

From German Patent Document DE 10 2007 012 132 A1, a warning device having a vibration alarm is known for warning a vehicle driver, which warning device has a vibration unit integrated in the driver seat, so that, when the vibration alarm is activated, it can be felt by the driver at a certain point of his body.

It is an object of the invention to create a warning device which is improved with respect to the state of the art and is adapted to new challenges.

This and other objects are achieved by a warning device in a motor vehicle for warning a vehicle driver as a function of a triggering signal of a driver assistance system in response to a certain event requiring a driver take-over. A mobile terminal is provided in the vehicle, which mobile terminal can be connected to the driver assistance system and has a corresponding program module, by which the unrestricted use of the mobile terminal is generally permitted. When the triggering signal is received, the program module interrupts the unrestricted use and outputs a warning signal prompting the driver to take over.

The invention is based on the following recognition. Particularly newer driver assistance systems, such as congestion assistants or the like, permit a reduced driver's attention for longer phases. Furthermore, with the increasing use of mobile terminals (Smartphones, iphones, ipads etc.), it can be assumed that, in longer phases of reduced driver's attention, such terminals are used by the driver to pass the time.

When, during the concentrated operation of such a device, a driver's attention is diverted, he could overlook acoustic, visual or haptic information according to the state of the art. According to the invention, it is therefore provided to correspondingly actuate the mobile terminal in addition or as an alternative.

Such a warning device is particularly suitable for driver assistance systems which support the driver by an at least partial take-over of the vehicle guidance. As soon as the driver take-over is necessary for safety reasons, the driver assistance system informs the driver of this necessity by triggering a warning signal on the mobile terminal, which itself had resulted in diverting the driver's attention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
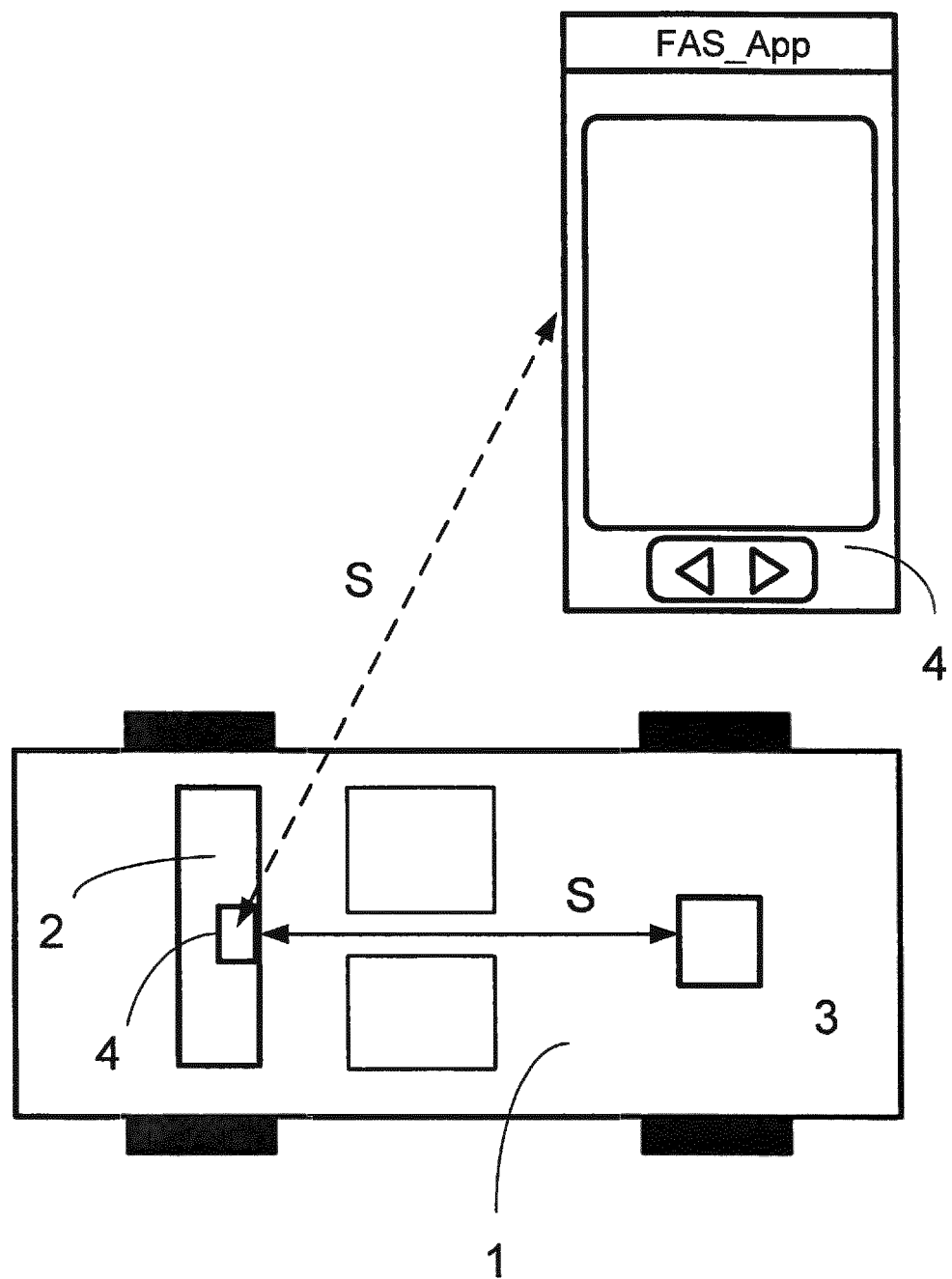
FIG. 1 is a schematic view of the components required for implementing the invention as well as their interaction.

FIG. 1 is a simplified view of a motor vehicle 1 having a dashboard 2 and a driver assistance system 3. Furthermore, a mobile terminal 4 is illustrated, for example, in the form of a Smartphone (such as an iPhone), which is either held in the driver's hand or is fastened, for example, in a mounting device at the dashboard 2.

The driver assistance system 3 supports the driver, for example, when driving on the autobahn at a constant speed, at a constant gap or in congested traffic with obstacle-avoidance maneuvers or with starting and braking interventions. The driver assistance system 3 supports the driver by an autonomous driving (with respect to the longitudinal and/or lateral movement). The driver assistance system 3 outputs a corresponding actuating or triggering signal S to the mobile terminal 4 by way of an electric line or wireless connection (for example, Bluetooth) when, for example, because of safety provisions, the driver himself again has to take over the vehicle guidance, and a corresponding reaction of the driver is therefore required.

The mobile terminal system 4 has a corresponding program module FAS_App, by which basically an unrestricted use of the mobile terminal 4 is permitted, but which, when the triggering signal S is received from the driver assistance system 4, interrupts the unrestricted use and outputs a warning signal prompting the driver to take over.

Figure 2B:
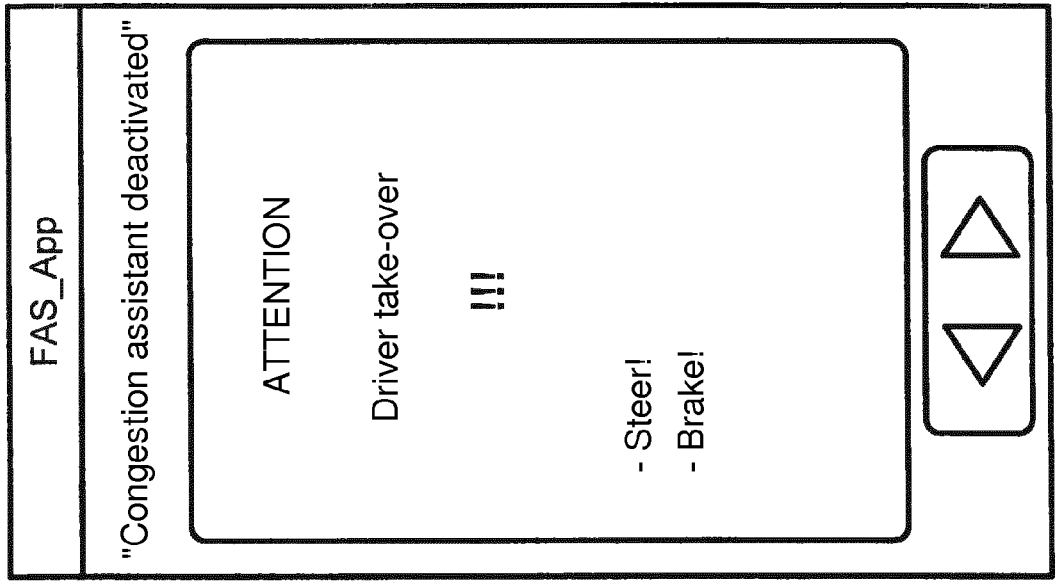
FIGS. 2a and 2b are views of an example of a warning signal and of the reaction of the mobile terminal, respectively.
Figure 2A:
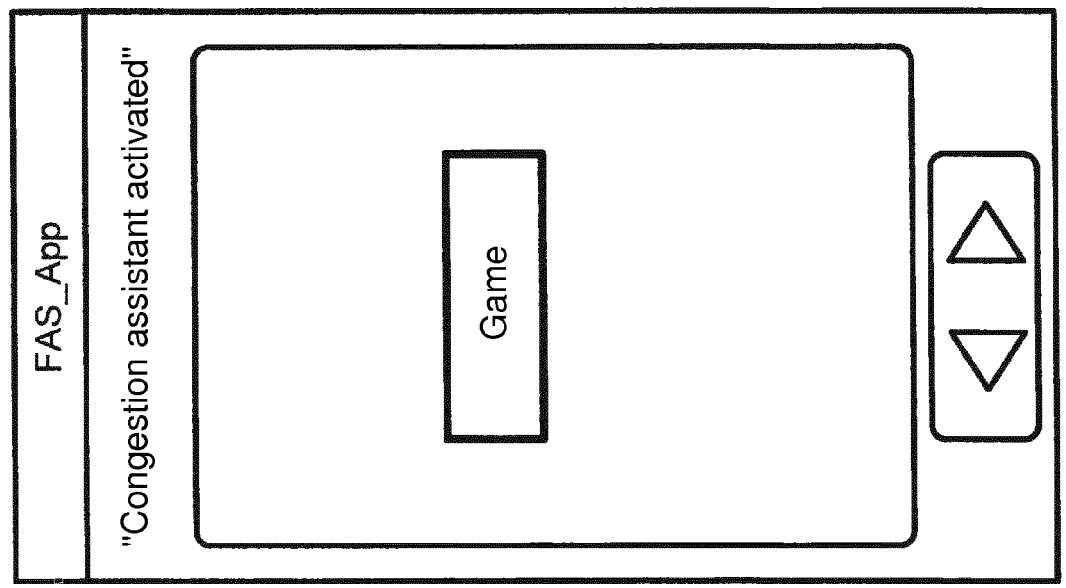

In FIG. 2, the use of the mobile terminal 4 is illustrated on the left-hand side (FIG. 2a)—an interactive game, for example, may also be played—while the driver assistance system 3 is active (for the example, "congestion assistant activated"). On the right-hand side (FIG. 2b), a driver take-over prompt is illustrated, which is output immediately after the deactivation of the driver assistance system 3 by way of the triggering signal S. The game is interrupted in order to prompt the driver to become more attentive and to drive the vehicle himself.

The warning signal preferably contains concrete operating instructions, such as "steer" and/or "brake", in order to shorten the driver's response time.

The warning signal may be output and the further use of the mobile terminal 4 may be prevented until the necessary interventions by the driver have been carried out.

In a further development of the invention, the triggering signal S may be output to the mobile terminal 4 only when the latter is also actuated. For this purpose, the vehicle sends, for example, by way of a central electronic control unit present anyhow (such as the control unit of the driver assistance system itself)—preferably in an encoded manner—, the condition data of the driver assistance system 3 (for example, which assistance function is switched on and/or whether a driver take-over is required, etc.) to the mobile terminal 4. The mobile terminal 4 autonomously checks by way of a program module FAS_APP whether an operation is present during an activated driver assistance function, and then outputs corresponding advice. This program module FAS_APP reduces the software load in the vehicle. In an expansion of the program module FAS_APP, also when there is no driver take-over (normal drive while the driver assistance system 3 is activated), the mobile terminal 4 can output the advice that the driver should nevertheless be attentive. This generally also additionally supports product safety. The purpose is therefore to displace "the examining intelligence" (and thus the computing expenditures) to the terminal 4 because the development expenditures for program modules, particularly in the form of so-called "apps", are lower than for the electronic modules of the motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for warning a driver of a motor vehicle, comprising:
    a driver assistance system configured to at least partially take-over vehicle navigation from the driver, and to output a triggering signal in response to a certain event requiring a driver take-over of the vehicle navigation from the driver assistance system;
    a mobile terminal located in the vehicle, the mobile terminal being coupled to the driver assistance system and having a corresponding program module by which unrestricted use of the mobile terminal is permitted in the vehicle, wherein
        the program module interrupts the unrestricted use and outputs a warning signal via the mobile terminal prompting the driver to take over said vehicle navigation from the driver assistance system when the triggering signal is received by the mobile terminal.

2. The system according to claim 1, wherein the warning signal comprises at least one specific operating instruction for the driver of the motor vehicle.

3. The system according to claim 1, wherein when the warning signal is output, further use of the mobile terminal is prevented until defined interventions in a drive of the motor vehicle have been carried out.

4. The system according to claim 1, wherein the triggering signal is output by the driver assistance system to the mobile terminal only when the mobile terminal is actuated.

5. A mobile terminal for use with a driver assistance system of a motor vehicle, wherein
    the mobile terminal is connectable to the driver assistance system in the motor vehicle that is configured to at least partially take-over vehicle navigation from a driver of the motor vehicle and includes a program module by which unrestricted use of the mobile terminal is permissible in the vehicle, and
    the unrestricted use of the mobile terminal is interrupted upon receiving a triggering signal from the driver assistance system in response to a defined event requiring a driver take-over of the vehicle navigation from the driver assistance system, the program module outputting a warning signal to the driver, via the mobile terminal, prompting the driver to take-over said vehicle navigation from the driver assistance system.

6. The mobile terminal according to claim 5, wherein the warning signal comprises a specific operating instruction for control of the motor vehicle.

7. The mobile terminal according to claim 5, wherein when the warning signal is output, further use of the mobile terminal is prevented until at least one specific drive intervention has been carried out.

8. A method for warning a vehicle driver that a driver take-over action from a driver assistance system is necessary, the method comprising the acts of:
    providing a mobile terminal in the vehicle, the mobile terminal being connected to a driver assistance system of the motor vehicle that is configured to at least partially take-over vehicle navigation from the vehicle driver and having a program module by which unrestricted use of them mobile terminal is permitted in the vehicle; and
    receiving, by the mobile terminal, from the driver assistance system, a triggering signal in response to a defined event requiring the driver take-over of the vehicle navigation from the driver assistance system; and
    upon receiving the triggering signal, interrupting the unrestricted use of the mobile terminal and outputting, via the mobile terminal, a warning signal prompting the driver to take over said vehicle navigation from the driver assistance system.

9. The method according to claim 8, further comprising the act of:
    preventing further use of the mobile terminal until a specific driver intervention action occurs.

10. The method according to claim 8, wherein the triggering signal is received only when the mobile terminal is actuated.

\* \* \* \* \*